United States Patent [19]

Proctor et al.

[11] 4,126,771

[45] Nov. 21, 1978

[54] TELEPHONE LINE LIFTING APPARATUS

[75] Inventors: D. Frederic Proctor, Redmond; Darrell D. Cole, Seattle, both of Wash.

[73] Assignee: Proctor & Associates Company, Redmond, Wash.

[21] Appl. No.: 819,268

[22] Filed: Jul. 27, 1977

Related U.S. Application Data

[63] Continuation-in-part of Ser. No. 782,326, Mar. 29, 1977, abandoned.

[51] Int. Cl.$^2$ ............................................. H04B 3/46
[52] U.S. Cl. ............................. 232/175.3 R; 179/2 A
[58] Field of Search ............... 179/175.3 R, 175.31 R, 179/2 A, 81 R

[56] References Cited

U.S. PATENT DOCUMENTS

| | | | |
|---|---|---|---|
| 3,725,613 | 4/1973 | Allen et al. | 179/175.3 R |
| 3,739,107 | 6/1973 | Spencer | 179/175.3 R |
| 3,773,986 | 11/1973 | Tremblay | 179/175.3 R |
| 3,852,537 | 12/1974 | Vincent | 179/175.3 R |
| 3,867,588 | 2/1975 | Pickens et al. | 179/175.3 R |
| 3,919,487 | 11/1975 | Gabrielson | 179/175.3 R |

OTHER PUBLICATIONS

Del-Tronics Associates, Inc., Model DTA-103, Jan. 16, 1976.

*Primary Examiner*—Douglas W. Olms

*Attorney, Agent, or Firm*—Christensen, O'Connor, Johnson & Kindness

[57] ABSTRACT

A line lifting apparatus is disclosed which functions to connect and disconnect a customer station and a telephone line extending from a central office to the customer station, for line testing purposes. The connection and disconnection is provided by a bistable latching relay which is controlled by a control circuit responsive to potentials impressed on the conductors of the telephone line. A first potential applied to either or both of the conductors of the telephone line causes the control circuit to place the bistable latching relay in a state wherein the telephone line is disconnected from the customer station, and a second potential applied to either or both of the conductors of the telephone line causes the control circuit to place the bistable latching relay in a state wherein the telephone line is connected with the customer station. The second potential differs in either magnitude or polarity from the first potential and preferably has a magnitude substantially equal to that normally applied to the telephone line at the central office by the central office station battery, and a like polarity, so that connection between the telephone line and the customer station is assured in normal operation of the telephone system. Four specific embodiments of the control circuit are disclosed, as is an embodiment of a switchable power supply adapted to selectively provide the first and second potentials at the central office.

19 Claims, 6 Drawing Figures

TELEPHONE LINE LIFTING APPARATUS

CROSS-REFERENCE TO RELATED APPLICATION

This application is a continuation-in-part of now abandoned application Ser. No. 782,326, filed Mar. 29, 1977, entitled "Telephone Line Lifting Apparatus," by D. Frederic Proctor and Darrell D. Cole, and assigned to the assignee of the present invention.

FIELD OF THE INVENTION

This invention generally relates to test equipment for telephone lines, and, more particularly, to apparatus which lifts or disconnects a telephone line extending between a central office and a customer station from customer-supplied station apparatus at the station so that the thus-lifted telephone line can be tested.

BACKGROUND OF THE INVENTION

It has become possible only recently for telephone company customers to install and use their own station apparatus in conjunction with a telephone line extending between the telephone company's central office and the customer station. Usually, the telephone company can exercise little or no control over the type and quality of such customer station apparatus and accordingly can assume no responsibility for its maintenance or operation. When a fault appears on the telephone line, therefore, it is desirable for the telephone company to determine precisely whose apparatus is causing the fault in advance of the telephone company sending a repairman to the customer station location to avoid the expense of the trip for which the telephone company will not be compensated if the fault has originated in the customer station apparatus.

The prior art teaches line lifting apparatus, a portion of which is located at the customer station, and which is operative to lift or disconnect the telephone line from the customer station apparatus at the points of interconnection thereof.

In one such apparatus, a pair of like-poled diodes interconnect, respectively, tip and ring conductors of the telephone line with a time delay circuit whose output is connected through a relay coil to ground. The relay contacts, in a de-energized condition of the relay, connect the tip and ring conductors to the customer station apparatus. When a test voltage is applied at the central office from either the tip conductor or the ring conductor to ground, one of the diodes will conduct, thereby actuating the time delay circuit which thereafter maintains the relay coil energized for a predetermined period of time. Energization of the relay coil causes the contacts thereof to disconnect the tip and ring conductors of the telephone line from the customer station apparatus and to connect the tip and ring conductors to a test apparatus, typically comprising a termination circuit including a series R-L network. Thereafter, testing signals are applied to the tip and ring conductors at the central office to measure the impedance between the lines and to carry out other tests. If the result of the tests carried out is negative, it can be assumed that the fault exists in the customer station apparatus and therefore an unnecessary trip can be avoided.

Such prior art line lifting apparatus encounters many problems in application. For example, if a ground fault exists on the telephone line at any point, the time delay circuit generally cannot be actuated by the application of a test voltage, thereby necessitating a trip to the customer station location even though the ground fault may exist in the customer station apparatus. Further, the time delay circuits of the prior art must typically include an energy storage device such as a capacitor which is charged by the test voltage and which is discharged through the relay coil to provide the predetermined period of relay actuation. Due to physical limitations on the size of such capacitors, the predetermined period of time of relay energization often is not long enought to permit the necessary tests to be conducted upon the line. In addition, the time delay circuit often adversely affects the tests that can be carried out on the line due to the fact that the time delay circuit must necessarily have a low impedance to permit the capacitor to be charged to a value sufficient to allow the relay to be actuated for even a short time. Finally, the time delay circuit, due to its relatively low impedance, often adversely affects ringing signals impressed on the line to a point where conventional ring-trip relays in the central office often detect the presence of the time delay circuit as an off-hook condition signifying that a telephone instrument has been picked up at the customer station when in fact such is not the case. In some cases, the time delay circuit may also distort dial pulses impressed on the line.

It is therefore an object of the present invention to provide a line lifting apparatus which permits a telephone line to be lifted for whatever time is required to carry out any and all tests on the line.

It is another object of this invention to provide such a line lifting apparatus which will function to lift the telephone line even though there is a ground fault on the telephone line from either the ring conductor or the tip conductor to ground.

It is yet another object of this invention to provide such a line lifting apparatus which has a relatively high impedance with respect to ground so as to not adversely affect tests conducted on the line and so as to not adversely affect ringing signals and dial pulses impressed on the line.

SUMMARY OF THE INVENTION

These objects, and others that will be realized from a consideration of the following portion of the specification are achieved, briefly, by a line lifting apparatus for disconnecting a telephone line, which telephone line has a pair of conductors extending between a central office and a customer station, from the customer station at a predetermined location along the telephone line. The line lifting apparatus comprises a control circuit means adapted to be interconnected with the telephone line, the control circuit means providing a first output signal in response to the presence for a predetermined period of time on at least one conductor of the telephone line. The control circuit means provides a second output signal in response to the presence for a predetermined period of time of a second potential on at least one conductor of the telephone line.

Bistable switching means are provided, the bistable switching means having first and second states. In the first state, the bistable switching means is adapted to interconnect the telephone line and the customer station at the predetermined location. In the second state, the bistable switching means is adapted to disconnect the telephone line from the customer station at the predetermined location. The bistable switching means is placed in the second state in response to each said first output signal and is placed in the first state in response to each said second output signal.

Preferably, the bistable switching means comprises a bistable latching relay means.

In a preferred embodiment, the control circuit means includes a capacitance means. Voltage threshold switching circuit means is also included which is operative to provide a conducting path therethrough when the voltage thereacross equals or exceeds a predetermined threshold value. First circuit means is provided for connecting the capacitance means and the voltage threshold switching circuit means in series circuit with the bistable switching means. Finally, second circuit means is provided for coupling the capacitance means to the pair of conductors of the telephone line, the second circuit means being operative to charge the capacitance means to a voltage greater than the threshold value in response to the presence on the telephone line of the first or the second potentials.

BRIEF DESCRIPTION OF THE DRAWINGS

The invention can perhaps best be understood by reference to the following portion of the specification taken in conjunction with the accompanying drawings in which:

FIG. 4 is a schematic diagram illustrating a second embodiment of the line lifter;

DESCRIPTION OF A PREFERRED EMBODIMENT

Figure 1:
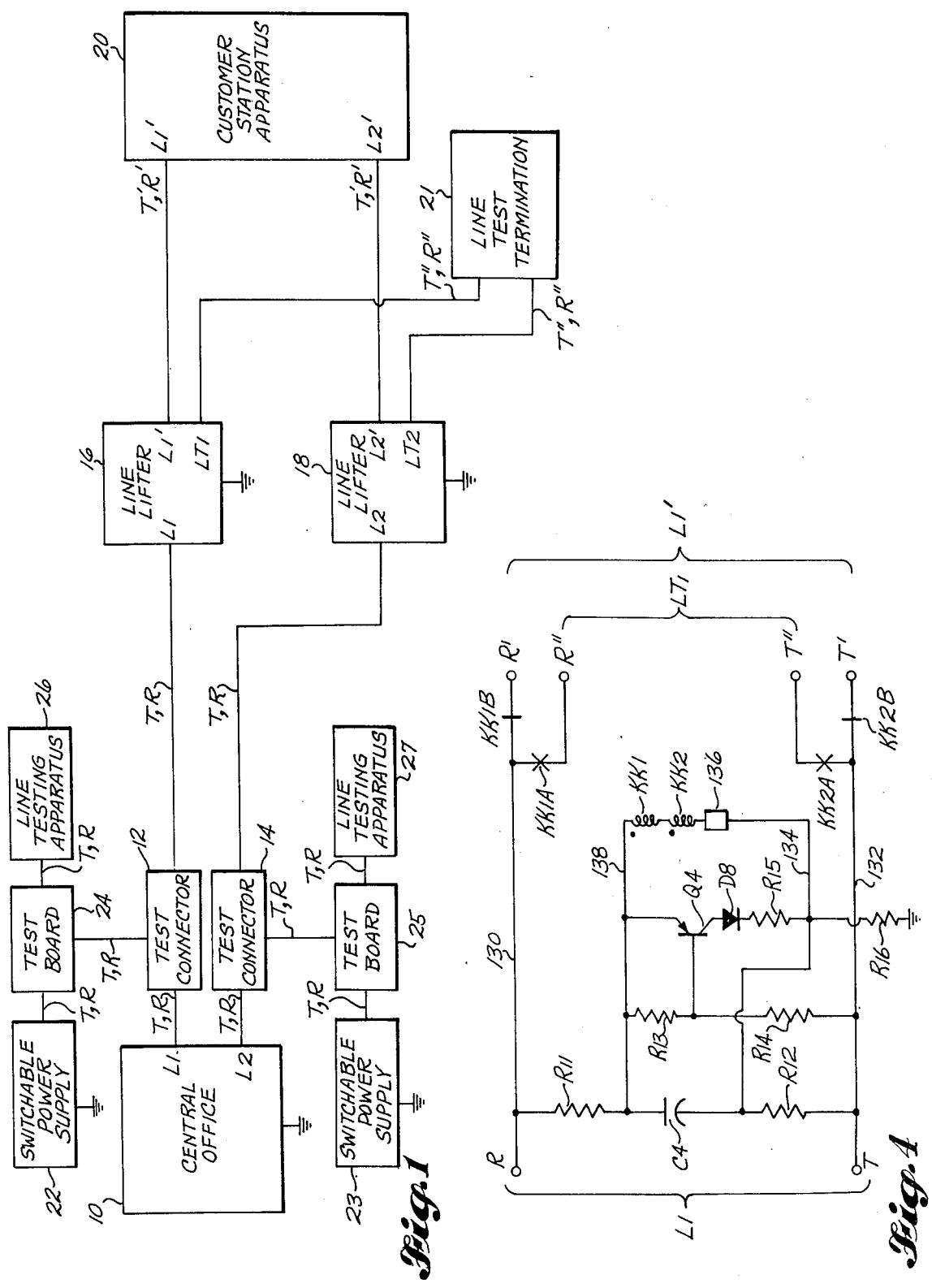
FIG. 1 is a block diagram showing the installation of first and second line lifting apparatus, constructed according to the teachings of the present invention, in conjunction with first and second lines extending from a central office to a customer station.

In FIG. 1, tip and ring conductors (TR) of first and second lines L1, L2 extend from a central office 10 to a customer station location. Arranged for selective interconnection with the conductors TR of lines L1, L2 and located at the central office location are test connectors 12 and 14, respectively.

At the customer station location, the conductors TR of the lines L1, L2 are connected to respective inputs of line lifters 16 and 18 at a point beyond which the telephone company takes no responsibility. Line lifters 16 and 18 have respective first outputs connected to tip and ring conductors T'R' of respective lines L1',L2' extending to a customer station apparatus 20. Similarly, line lifters 16 and 18 have respective second outputs connected to the tip and ring conductors T"R" of lines LT1, LT2 going to respective inputs of a line test termination circuit 21. Both line lifters 16 and 18 are also referenced to ground potential.

Normally, line lifters 16 and 18 are in a first state wherein they respectively interconnect lines L1 and L1', and lines L2 and L2'. Similarly, test connectors 12 and 14 normally afford a direct metallic connection between the central office 10 and the customer station apparatus 20.

When a fault is detected on either of the lines L1, L2, L1' or L2', a technician at the central office 10 connects a switchable power supply 22 and a line testing apparatus 26 to the test connector 12 through a test board 24, or, a switchable power supply 23 and a line testing apparatus 27 to the test connector 14 through a test board 25. The technician then causes either or both of the test connectors 12 and 14 to be actuated whereupon the direct metallic connections between the central office 10 and the line lifters 16, 18 are disconnected and reconnected to the test boards 24 and 25. As illustrated, the conductors TR of lines L1 and L2 are thereby made available to the switchable power supply 22 and line testing apparatus 26, and to the switchable power supply 23 and the line testing apparatus 27. Thereafter, the technician actuates that one of the switchable power supplies 22 or 23 associated with the line on which the fault has been detected which momentarily applies a first potential signal to either or both of the conductors TR of the respective line L1 or L2. The corresponding one of the line lifters 16 and 18 functions to detect this first potential signal and to accordingly switch to a second state to disconnect lines L1 and L1', or L2 and L2', and to interconnect lines L1 and LT1, or L2 and LT2.

The technician thereafter can conduct tests on the lines L1 or L2 by operation of the corresponding line testing apparatus 26 or 27 and the line test termination circuit 21. Included in line test termination circuit 21 are conventional circuits, not forming a part of the present invention, for permitting tests to be carried out on the lines L1 and L2 from the central office 10. For example, for each line L1 or L2, the termination thereof reflected on the conductors T"R" at line test termination circuit 21 may be left open so that conventional voltage-to-ground, resistance-to-ground, or other tests may be conducted. Or, a noise test may be conducted by connecting, in response to a test voltage applied by either the line testing apparatus 26 or the line testing apparatus 27, a resistive-capacitive termination across the conductors T"R" associated with the corresponding line L1 or L2. Another test circuit includes an oscillator in circuit with the conductors T"R". When the line lifter 16 or the line lifter 18 is placed in its second state, the oscillator impresses signalling tones on the corresponding line L1 or L2 for test purposes. The line test termination circuit 21 may also include circuits for interconnecting the conductors T"R" of lines LT1 and LT2 upon switching of both line lifters 16 and 18 to their second states so that a loop-around test can be conducted by applying a signal to line L1 from the line testing apparatus 26 and measuring the response back appearing on line L2 at the line testing apparatus 27.

During the time that these tests are being conducted, the line lifters 16 and 18 remain in their second states wherein the customer station apparatus 20 is disconnected from the lines L1 and L2. In fact, as will be appreciated hereinafter, the line lifters 16 and 18 will remain in their second states indefinitely. To return the line lifters 16 and 18 to their normal, first states at the conclusion of the test, the switchable power supplies 22, 23 are actuated to momentarily apply a second potential signal to either or both of the conductors TR of the respective lines L1 and L2, which second potential signal is detected by the line lifters 16 and 18 which thereafter act to disconnect the lines L1 and LT1, and L2 and LT2, and to re-connect the lines L1 and L1', and L2 and L2'. At this time, the test connectors 12, 14 are deactuated to disconnect the test boards 24 and 25 from lines L1 and L2 and to re-connect the central office 10 with lines L1 and L2, thereby again affording direct metallic connections between the central office 10 and the customer station apparatus 20. In a preferred embodiment, line lifters 16 and 18 also atomatically reset to their normal, first states upon re-connection of the central office 10 with lines L1 and L2.

Figure 2:
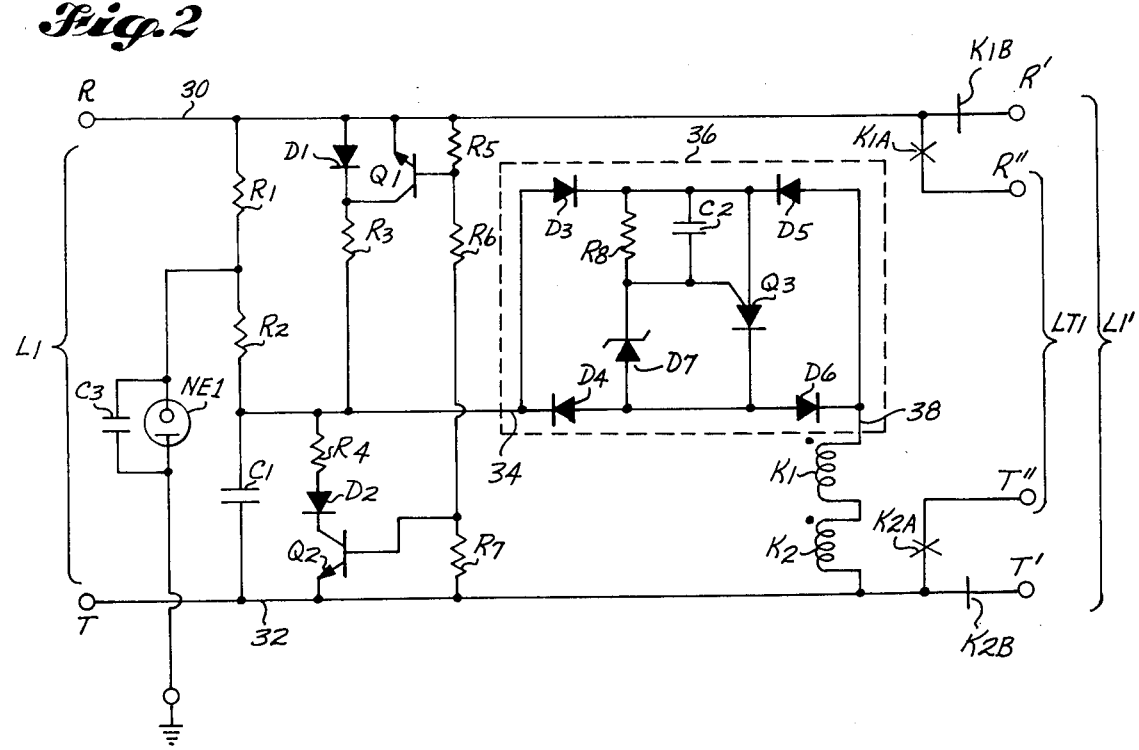
FIG. 2 is a schematic diagram illustrating a first embodiment of the line lifter shown in FIG. 1.

With reference now to FIG. 2, the line lifter 16 (line lifter 18 being identical) includes a conductor 30 for interconnecting the conductors R and R' of lines L1 and L1', and a conductor 32 for interconnecting the conductors T and T' of lines L1 and L1'. A resistor R1, a resistor R2, and a capacitor C1 are connected in series across conductors 30 and 32. The common junction between resistors R1 and R2 is coupled to ground potential through a neon gas tube NE1, with a capacitor C3 being connected across gas tube NE1. Resistors R5, R6, and R7 are also connected in series across conductors 30 and 32, with the common junction of resistors R5 and R6 being connected to the base electrode of a transistor Q1 and the common junction of resistors R6 and R7 being connected to the base electrode of a transistor Q2. The emitter electrodes of transistors Q1 and Q2 are respectively connected to conductors 30 and 32. The collector electrode of transistor Q1 is connected to the common junction of the cathode of a diode D1 and one end of a resistor R3, with the anode of diode D1 being connected to the conductor 30 and with the other end of resistor R3 being connected to the common junction of resistor R2 and capacitor C1. Likewise, the collector electrode of transistor Q2 is connected to the cathode of a diode D2 whose anode is coupled through a resistor R4 to the common junction of resistor R2 and capacitor C1.

The common junction of resistor R2 and capacitor C1 is also coupled to an input 34 of a voltage threshold switching circuit 36 whose output 38 is coupled through series-connected relay coils of relays K1, K2, to the conductor 32. In the embodiment illustrated in FIG. 2, the voltage threshold switching circuit 36 includes a full-wave diode bridge comprising diodes D3, D4, D5 and D6, with a common junction of diodes D3 and D4 comprising the input 34, and with a common junction of diodes D5 and D6 comprising the output 38. A resistor R8 and a zener diode D7 are connected in series from a common junction of diodes D3 and D5 to a common junction of diodes D4 and D6. A programmable unijunction transistor Q3 has its anode connected to the common junction of diodes D3 and D5, its cathode connected to the common junction of diodes D4 and D6, and its gate electrode connected to a common junction of resistor R8 and zener diode D7. A capacitor C2 is connected from the common junction of diodes D3 and D5 to the gate electrode of programmable unijunction transistor Q3.

As illustrated in FIG. 2, the relay coils of relays K1, K2 are connected with the same polarity and have associated therewith respective relay contacts K1A, K1B and K2A, K2B. Contacts K1A and K2A function to connect the conductors 30 and 32, respectively, to the conductors R" T" of line LT1, and contacts K1B, K2B function to connect the conductors 30 and 32, respectively to the conductors R' T' of line L1'. In the normal, first state of line lifter 16, contacts K1A, K2A are open and contacts K1B, K2B are closed.

Although a further identification of the component elements illustrated in FIG. 2 will be given herinafter, it should be noted that the voltage threshold switching circuit 36 may comprise any device for providing a conducting path between its input 34 and its output 38 when the voltage thereacross exceeds a predetermined threshold value, no matter what its polarity. For example, the voltage threshold switching circuit 36 also may comprise a bilateral PNPN diode or a neon gas tube (as discussed hereinafter with respect to the embodiment of FIG. 6). Also, each of the relays K1, K2 preferably comprises a latching reed relay whose contacts are latched in a first state upon the application of the relay coil thereof of a voltage pulse having a first polarity, and whose contacts are latched in a second state upon the application of the relay coil thereof of a voltage pulse having a second, opposite polarity. Such a latching reed relay is commercially available from a number of sources. Further, only a single latching reed relay may be utilized if that relay has two pairs of both normally-closed and normally-open contacts.

Figure 3:
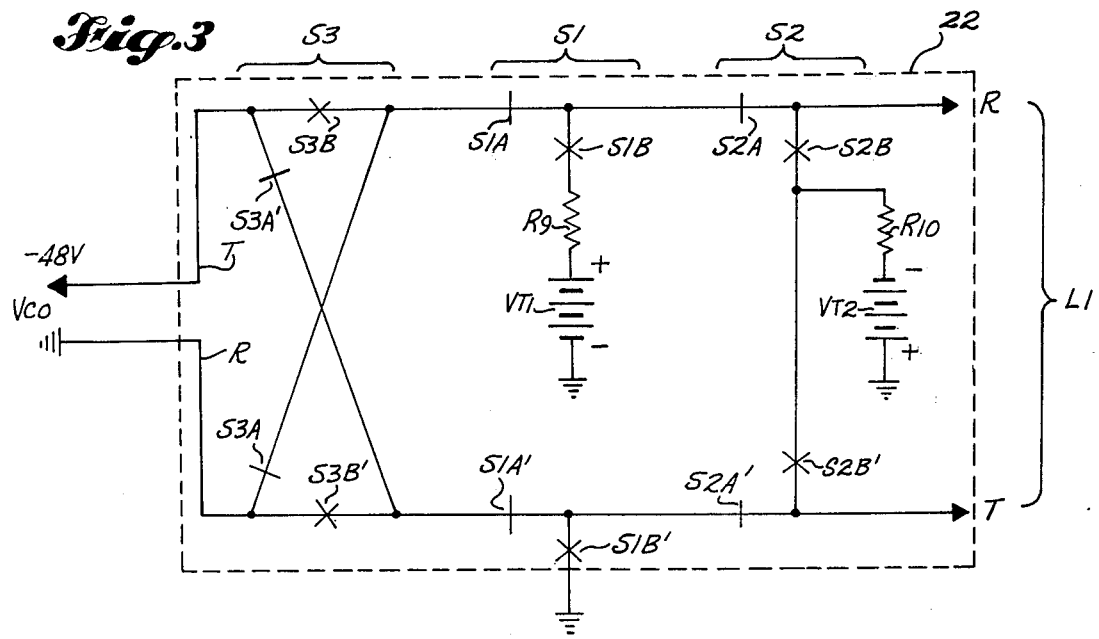
FIG. 3 is a schematic diagram of the switchable power supply shown in FIG. 1.

In FIG. 3, an embodiment of switchable power supply 22 (switchable power supply 23 being identical) particularly useful with the line lifter illustrated in FIG. 2 is in series circuit with the conductors TR of line L1 and a central office battery $V_{co}$. Conductor T is coupled through the switchable power supply 22 to a negative terminal of the battery $V_{co}$, typically at −48 VDC, and the conductor R is coupled through switchable power supply 22 to a positive terminal of battery $V_{co}$, typically at ground potential.

Included in switchable power supply 22 are momentary switches S1, S2 and S3. Respective normally-closed contacts S1A, S2A and S3A of switches S1, S2 and S3 are connected in series circuit in the conductor R, and respective normally-closed contacts S1A', S2A' and S3A' of switches S1, S2 and S3 are connected in series circuit in the conductor T. Normally-open contacts S1B of switch S1 couple conductor R through a resistor R9 to the positive terminal of a first voltage source $V_{T1}$ whose negative terminal is connected to ground potential and corresponding normally-open contacts S1B' of switch S1 couple the conductor T to ground potential.

Normally-open contacts S2B, S2B', respectively couple the conductors R and T to the negative terminal of a second voltage source $V_{T2}$ through a resistor R10, with the positive terminal of voltage source $V_{T2}$ being connected to ground potential. Finally, normally-open contacts S3B of switch S3 couple the conductor R to the negative terminal of battery $V_{co}$, and normally-open contacts S3B' of switch S3 couple the conductor T to the positive terminal of battery $V_{co}$.

Actuation of switches S1, S2 and S3 respectively, cause the line lifter 16 to undergo a loop set operation, a ground set operation, and a reset operation, as detailed hereinafter.

In the loop-set operation, which is the normal mode of operation of the line lifting apparatus, momentary actuation of switch S1 opens contacts S1, S1A' and closes contacts S1B, S1B'. Therefore, ground potential is applied to the conductor T and a first, positive potential with respect to ground potential is applied to the conductor R from the voltage supply $V_{T1}$. As an example, $V_{T1}$ may have a voltage of from 100 to 130 VDC.

As contacts S2A, S2A' remain closed, a voltage corresponding to that provided by $V_{T1}$ is applied to the conductors 30 and 32 at the line lifter 16 (FIG. 2), with conductor 30 being at positive potential and with conductor 32 being at ground potential. In response, capacitor C1 is charged from the conductors 30, 32 through a divider network including first, second and third current paths. The first current path includes series-connected resistors R1 and R2 and the second current path is through diode D1 and resistor R3, with transistor Q1 being maintained off by the reverse bias applied to its emitter-base junction by circuitry including the series-connected resistors R5, R6 and R7. The third current path includes resistor R4, diode D2 and the collector-emitter junction of transistor Q2 which is maintained on by the forward bias applied to its base-emitter junction by circuitry including resistors R5, R6 and R7.

The component values for the voltage divider should be chosen so that capacitor C1 is charged relatively quickly to a value which will cause voltage threshold switching circuit 36 to provide a conducting path therethrough from its input 34 to its output 38. With the component values and types listed hereinafter in Table I and with an applied voltage of +130 VDC, it has been found that capacitor C1 will charge to a point wherein the input 34 is at approximately 45 VDC within 750 milliseconds after switch S1 is actuated.

The voltage threshold switching circuit 36 is chosen to have a threshold voltage which is lower than that of the battery $V_{co}$, e.g., 36 VDC. In the embodiment of voltage threshold switching circuit 36 shown in FIG. 2, the zener diode D7 may be chosen to have a zener voltage approximating the desired threshold voltage so that upon conduction through zener diode D7, current will be drawn through resistor R8 and into the gating electrode of programmable unijunction transistor Q3 which will accordingly conduct to provide a conducting path from input 34 to output 38 through diodes D3 and D6.

At this time, a voltage pulse is applied across the coils of relays K1 and K2, thereby placing those relays in their second states wherein contacts K1A and K2A thereof are closed and contacts K1B and K2B are opened.

In the ground-set operation, which may be utilized whenever the loop-set operation fails due to an open condition of the conductors of line L1, a short across the conductors of lines L1 or L1', or an off-hook condition on line L1', the switch S2 (FIG. 3) is actuated so that contacts S2A, S2A' are opened and contacts S2B, S2B' are closed to short the conductors R, T together and to apply thereto the potential at the negative voltage supply $V_{T2}$ (typically −100 to −130 VDC). The conductors TR will therefore be at a first, negative potential with respect to ground.

At the line lifter 16 (FIG. 2) conductors 30 and 32 will be equipotential and negative with respect to ground, which potential is reflected at one side of the neon tube NE1 connected to the common junction of resistors R1 and R2. Accordingly, the neon gas tube NE1 fires so that a circuit is completed from ground potential to the conductor 30 through NE1 and resistor R1 and to the conductor 32 through NE1, resistor R2 and capacitor C1. Both transistors Q1 and Q2 are maintained off since conductors 30 and 32 are equipotential, and diode D1 is reverse-biased. Therefore, the possible current paths through resistors R3 and R4 are blocked. Those skilled in the art will realize that resistors R1 and R2 provide a current divider whereby capacitor C1 shortly charges to a voltage which is greater than the threshold voltage of voltage threshold switching circuit 36. As input 34 is positive with respect to output 38, switching circuit 36 conducts to again apply a positive voltage pulse to the coils of relays K1 and K2. With the component values and types listed in Table I, a maximum time of about one second is required to place the line lifter 16 in its second state in this ground-set operation.

In the reset operation, it will be noted that once switches S1 and S2 are deactuated, the contacts S1A, S1A', and S2A, S2A', thereof close to couple the negative terminal of the battery $V_{co}$ to the conductor R (through normally-closed contacts S3A) and the negative terminal of battery $V_{co}$ to the conductor T (through normally-closed contacts S3A'). At the line lifter 16, the impressed voltage will have the same polarity as that provided during actuation of switch S1 during the loop operation, and, accordingly, the divider network including resistors R1, R2, R3 and R4 provides current paths to and from the capacitor C1. However, the magnitude of the battery $V_{co}$ (typically 48 VDC) is less than that of the voltage supply $V_{T1}$, and therefore not sufficient to cause capacitor C1 to charge to a value which will exceed the threshold voltage for the voltage threshold switching circuit 36. The line lifter 16 accordingly remains in its second state.

When switch S3 is momentarily actuated, the polarity of the connection of the battery $V_{co}$ to the line L1 is reversed, with the negative terminal of battery $V_{co}$ being coupled to the conductor R through contacts S3B and the positive terminal of battery $V_{co}$ being coupled to the conductor T through contacts S3B'. At the line lifter 16, the conductor 30 is at a second, negative potential (approximately −48 VDC) and the conductor 32 is at ground potential. Accordingly, transistor Q1 is maintained on and transistor Q2 is maintained off. Since resistor R4 no longer provides a current path (as was provided during the loop set operation), capacitor C1 can be charged to a voltage greater than the threshold voltage of voltage threshold switching circuit 36 through a first current path including resistors R1 and R2 and a second current path including transistor Q1 and resistor R3, with the input 34 of voltage threshold switching circuit 36 being negative with respect to the output 38 thereof. When programmable unijunction transistor Q3 conducts, a current path exists through diode D4, programmable unijunction transistor Q3, and diode D5 to discharge the capacitor C1 through the relay coils of relays K1 and K2. It will be noted that the voltage pulse thereby applied to these relay coils is opposite in polarity to that applied upon the actuation of switches S1 and S2, thereby causing the relays K1 and K2 to assume their first states wherein contacts K1A, K2A, thereof are opened and contacts K1B, K2B thereof are closed to thereby reconnect the lines L1 and L1'. With the component values and types listed in Table I, a maximum time of about 1.75 second is required to place the line lifter 16 in its first state in the reset operation.

Since the polarity and magnitude of the voltage signal applied to the line L1 upon actuation of switch S3 is identical to that normally provided by the central office station battery, it will also be appreciated by those skilled in the art that the line lifter 16 will automatically undergo its reset operation whenever the central office battery in the central office 10 is reconnected with the line L1 upon deactuation of test connector 12.

Under normal line conditions when the central office station battery is connected to the line L1, the conductor 30 will be at a negative potential (approximately −48 VDC) and the conductor 32 will be at ground potential. As a result, transistor Q1 will be maintained on and transistor Q2 will be maintained off. Therefore, the impedance presented to line L1 by the line lifter 16 will be that formed by resistors R1, R2 and R3 and capacitor C1. With the component values hereinafter set forth in Table I, those skilled in the art will recognize that the line lifter 16, due to its high impedance, has little or no effect on tests that are conducted upon the line L1, or upon ringing voltages that might be impressed thereon. Due to the fact that resistors R1 and R2 preferably are equi-valued, neon gas tube NE1 provides a balanced AC path to ground from the conductors T and R of line L1 to minimize any ground noise from occurring on those conductors. Balanced ringing voltages impressed across the conductors R and T also will not charge the capacitor C1 so as to cause it to improperly operate the voltage threshold switching circuit during the impression of the ringing voltage. Finally, capacitor C1 inhibits the operation of the line lifter 16 in response to high potential, transient voltages inasmuch as a certain time, e.g., 750 ms, is required to develop a voltage which will cause circuit 36 to conduct.

TABLE I

| Component | Type and/or Value |
|---|---|
| R1 | 2.2 megohms |
| R2 | 2.2 megohms |
| R3 | 1.5 megohms |
| R4 | 820 kilohms |
| R5 | 470 kilohms |
| R6 | 10 megohms |
| R7 | 470 kilohms |
| R8 | 150 kilohms |
| R9 | 2 kilohms |
| R10 | 2 kilohms |
| C1 | 1 microfarad |
| C2 | .01 microfarad |
| C3 | .01 microfarad |
| D1- D6 | CD 12727 |
| D7 | 1N3530 |
| Q1 | 2N2484 |
| Q2 | 2N2484 |
| Q3 | 2N6027 |
| NE1 | NE83 |
| $V_{T1}$ | 100- 130 VDC |
| $V_{T2}$ | -(100- 130) VDC |
| $V_{cc}$ | 48 VDC |

Now referring to FIG. 4, a line lifter circuit is shown therein which generally functions in a manner similar to the line lifter circuit shown in FIG. 2. Assuming that the circuit in FIG. 4 is being utilized as the line lifter 16, it is noted that the circuit includes a conductor 130 for interconnecting the conductors R and R' of lines L1 and L1', and a conductor 132 for interconnecting the conductors T and T' of lines L1 and L1'. A resistor R11, a capacitor C4, and a resistor R12 are connected in series across conductors 130 and 132. A conductor 138 is connected to the common junction between resistor R11 and capacitor C4, and a conductor 134 is connected to the common junction between capacitor C4 and resistor R12. The emitter of a transistor Q4 is connected to conductor 138, and the collector of transistor C4 is coupled to conductor 134 through series-connected diode D8 and resistor R15. Resistors R13 and R14 are connected in series across conductors 138 and 132, with the common junction between resistors R13 and R14 being connected to the base of transistor Q4. A resistor R16 couples the conductor 134 to ground potential.

Also connected in series across conductors 138 and 134 are the relay coils of relays KK1 and KK2 and a voltage threshold switching circuit 136. The relay coils of relays KK1 and KK2 are connected with the same polarity and have associated therewith respective relay contacts KK1A, KK1B and KK2A, KK2B. Contacts KK1A and KK2A function to connect the conductors 130 and 132, respectively, to the conductors R" T" of line LT1, and contacts KK1B, KK2B function to connect the conductors 130 and 132, respectively, to the conductors R' T' of line L1'. In the normal, first state of line lifter 16, contacts KK1A, KK2A are open and contacts KK1B, KK2B are closed. In practice, the relays KK1 and KK2, and the voltage threshold switching circuit 136, may be identical to the relays K1 and K2 and the voltage threshold switching circuit 36 shown in FIG. 2.

With the circuit of FIG. 4, a plurality of different loop-set operations, a single ground-set operation, and a plurality of reset operations are possible.

In the preferred loop-set operation, a first potential signal is applied to the line L1 at the central office 10, such as by the switchable power supply 22, so that the conductor 130 is maintained at ground potential and the conductor 132 is maintained at some negative potential, e.g., minus 100 VDC. Under these conditions, transistor Q4 is maintained on by the negative bias applied to its base-emitter junction via resistors R13 and R14, and diode D8 is forward-biased. As a result, resistor R15 is connected across conductors 138 and 134, and therefore across capacitor C4. It will therefore be seen that two current paths to ground exist from the negative potential present on conductor 132, the first of these current paths being through resistor R12 and resistor R16 and the second current path being through resistor R12, resistor R15, diode D8, transistor Q4, and resistor R11. With the component values and types listed hereinafter in Table II, those skilled in the art will appreciate that capacitor C4 will charge in about 650 milliseconds to a point where the voltage thereacross exceeds the threshold voltage of voltage threshold switching circuit 136, e.g., 36 volts, when the voltage with respect to ground provided by the potential applied to conductor 132 equals or exceeds 90 VDC. In response, voltage threshold switching circuit 136 provides a conducting path therethrough to complete a circuit through the relay coils of relays KK1 and KK2. At this time, a positive voltage pulse is applied across the coils of relays KK1 and KK2 as capacitor C4 discharges, thereby placing those relays in their second state wherein contacts KK1A and KK2A thereof are closed and contacts KK1B and KK2B thereof are open.

In the ground-set operation, conductors T and R are connected together at the central office 10 and a first, positive potential with respect to ground, e.g., +100 VDC, is applied thereto. Under these conditions, transistor Q4 is maintained off because no bias is applied to its base and resistor R15 is therefore not connected across the conductors 138 and 134. Accordingly, positive potential is applied to one side of capacitor C4 through resistor R11, and a smaller potential is applied to the other side of capacitor C4 due to the voltage divider provided by resistors R12 and R16. With the component values and types listed hereinafter in Table II, those skilled in the art will appreciate that capacitor C4 will charge in about 1.2 second to a point where the voltage thereacross exceeds the threshold voltage of voltage threshold switching circuit 136 when the potential with respect to ground applied to conductors 130 and 132 equals or exceeds 90VDC. As with the preferred loop-set operation, a positive voltage pulse will thereby be applied across the coils of relays KK1 and KK2 when voltage threshold switching circuit 136 conducts.

In the preferred reset operation, the conductor R is maintained at some second, negative potential, e.g., −48 VDC, and the conductor T is at ground potential. Under these conditions, transistor Q4 is maintained off and diode D8 is reverse-biased. Accordingly, resistor R15 is not connected across the conductors 138 and 134. As a result, negative potential is applied to one side of capacitor C4 through resistor R11 and ground potential is applied to the other side of capacitor C4 through resistors R12 and R16. Those skilled in the art will appreciate that the capacitor C4 charges in about 1.1 second to a voltage exceeding the threshold voltage of voltage threshold switching circuit 136 in such a case so that voltage threshold switching circuit 136 provides a conducting path therethrough to place the relay coils of relays KK1 and KK2 in circuit with capacitor C4. The capacitor C4 then provides the negative pulse through those relay coils, opposite in polarity to that applied during the loop-set and ground set operations, thereby causing the relays KK1 and KK2 to assume their first, normal states, wherein contacts KK1A, KK2A thereof are opened and contacts KK1B, KK2B thereof are closed.

TABLE II

| Component | Type and/or Value |
| --- | --- |
| R11 | 470 kilohms |
| R12 | 470 kilohms |
| R13 | 470 kilohms |
| R14 | 10 megohms |
| R15 | 1.5 megohms |
| R16 | 750 kilohms |
| C4 | 1 microfarad |
| D8 | CD 12727 |
| Q4 | 2N4249 |
| 136 | Same as switching circuit 36 |

Figure 5:
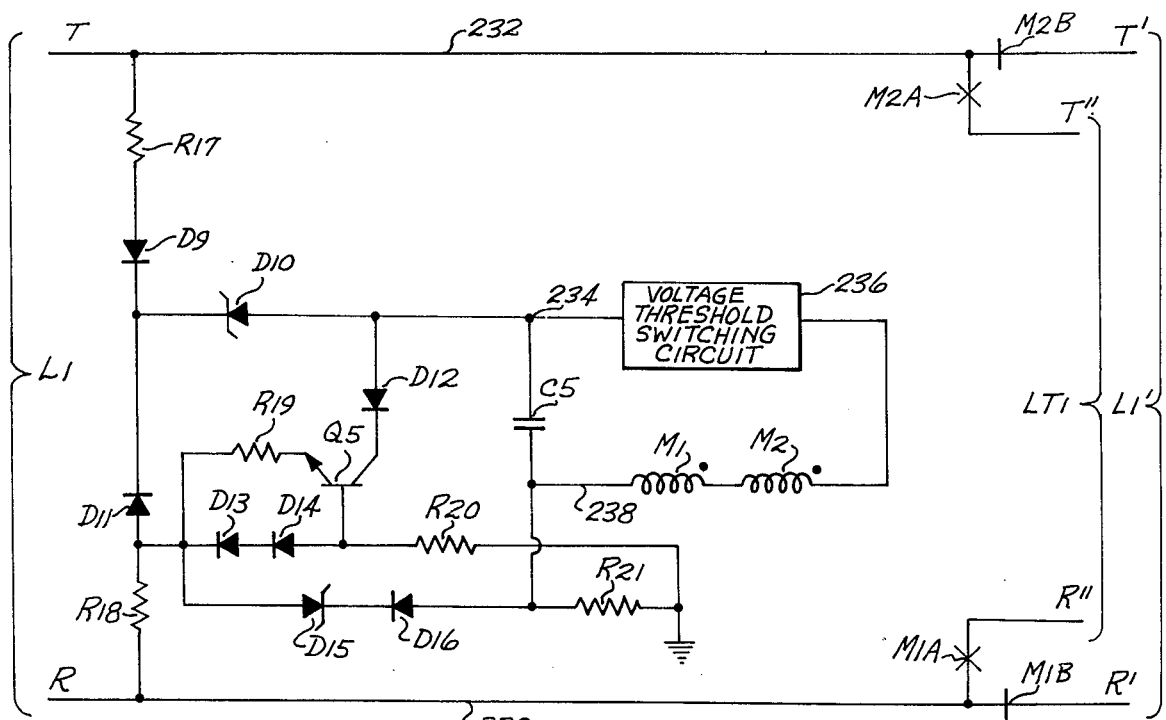
FIG. 5 is a schematic diagram illustrating a third embodiment of the line lifter; and, FIG. 6 is a schematic diagram illustrating a fourth embodiment of the line lifter.

Now referring to FIG. 5, a line lifter circuit is shown therein which generally functions in a manner similar to the line lifter circuits shown in FIGS. 2 and 4. Assuming that the circuit in FIG. 5 is being utilized as the line lifter 16, it is noted that the circuit includes a conductor 230 for interconnecting the conductors R and R' of lines L1 and L1', and a conductor 232 for interconnecting the conductors T and T' of lines L1 and L1'. A resistor R17, a diode D9, a diode D11, and a resistor R18 are connected in series across conductors 232 and 230, with diode D9 being poled to conduct from resistor R17 to the common junction of diode D9 and diode D11, and with diode D11 being poled to conduct from resistor R18 to that common junction. A transistor Q5 has its emitter coupled to the common junction of diode D11 and resistor R18 by a resistor R19, and has its collector coupled to the common junction of diodes D9 and D11 by a series connection of a diode D12 and a zener diode D10, with diode D12 being poled to conduct toward the collector of transistor Q5. The base of transistor Q5 is coupled to the common junction of diode D11 and resistor R18 by the series connection of diodes D13 and D14, with diodes D13 and D14 being poled to conduct toward that common junction. The base of transistor Q6 is also coupled to ground potential by a resistor R20. The common junction of diode D11 and resistor R18 is also coupled to ground potential by the series connection of a zener diode D15, a diode D16, and a resistor R21, with diode D16 being poled to conduct toward that common junction. Zener diode D15 and diode D16 serve to provide high reverse-voltage protection for transistor Q5.

The common junction of zener diode D10 and diode D12 is connected by a conductor 234 to one side of a capacitor C5. The common junction of diode D16 and resistor R21 is connected by a conductor 238 to the other side of capacitor C5. Connected in parallel with capacitor C5, and therefore across 234 and 238, is the series connection of a voltage switching circuit 236 and the relay coils of relays M1 and M2. The relay coils of relays M1 and M2 are connected with the same polarity and have associated therewith respective relay contacts M1A, M1B and M2A, M2B. Contacts M1A and M2A function to connect the conductors 230 and 232, respectively, to the conductors R'', T'' of line LT1, and contacts M1B, M2B function to connect the conductors 230 and 232, respectively, to the conductors R', T' of line L1'. In the normal, first state of line lifter 16, contacts M1A, M2A are open and contacts M1B, M2B are closed. In practice, the relays M1 and M2, and the voltage threshold switching circuit 236, may be identical to the relays K1 and K2 and the voltage threshold switching circuit 36 shown in FIG. 2.

When the circuit of FIG. 5, a plurality of ground-set operations and a single reset operation are possible. The circuit of FIG. 5 is particularly distinguished from those previously discussed in that there is no loop-set operation available, and in that the time of operation of the circuit in the reset operation is substantially greater than the times of operation of the circuit in any of the ground-set operations.

In the preferred ground-set operation, a first potential signal is applied to line L1 at the central office 10, such as by the switchable power supply 22, such that either the conductor R or the conductor T is maintained at some positive potential, e.g., +100 VDC. Under either of these conditions, transfer Q5 and diodes D13 and D14 are reverse-biased and therefore nonconductive. If the positive potential is maintained on conductor T, a charging current path for capacitor C5 exists from conductor 232 to ground through resistor R17, diode D9, diode D10, capacitor C5 and resistor R21. If the postive potential is maintained on conductor R, then a similar charging current path for capacitor C5 exists from conductor 230 to ground through resistor R18, diode D11, diode D10, capacitor C5, and resistor R21. With the component values and types listed hereinafter in TABLE III, those skilled in the art will appreciate that capacitor C5 will charge to a point where the voltage thereacross exceeds the threshold voltage of voltage threshold switching circuit 236, e.g., 36 volts, when the voltage with respect to ground provided by the potential applied to either conductor 230 or 232 equals or exceeds 90VDC. In response, voltage threshold switching circuit 236 provides a conducting path therethrough to complete a circuit through the relay coils of relays M1 and M2. At this time, a positive voltage pulse is applied across the coils of relays M1 and M2 as capacitor C5 discharges, thereby placing those relays in their second state wherein contacts M1A and M2A thereof are closed and contacts M1B and M2B thereof are open.

Under either of the conditions discussed, approximately 1.5 second is required for capacitor C5 to charge to the threshold voltage of voltage threshold switching circuit 236. In another ground-set operation, the conductors T and R are connected together at the central office 10 and a positive potential with respect to ground, e.g., +100 VDC, is applied thereto. Under these conditions, the operation of the circuit in FIG. 5 proceeds exactly as described, but the charging time for capacitor C5 is reduced to approximately 1 second since resistors R17 and R18 are effectively connected in parallel.

In the reset operation, the conductor R is maintained at some negative potential, e.g. −48 VDC. Under this condition, diode D11 is reverse-biased and therefore nonconductive. Transistor Q5 and diodes D13 and D14, however, are forward-biased, and therefore conduct to provide a charging current path to capacitor C5 which exists from conductor 230 to ground through resistor R18, diodes D13 and D14, transistor Q5, diode D12, capacitor C5, and resistor R21. Transistor Q5 and its associated components, and diodes D13 and D14, act as a constant current source to limit the charging current supplied to capacitor C5 through this charging current path. With the component values and types listed in TABLE III, those skilled in the art will appreciate that approximately 17 seconds is required for capacitor C5 to charge to a voltage exceeding the threshold voltage of voltage threshold switching circuit 236 so that voltage threshold switching circuit 236 provides a conducting path therethrough to place the relay coils of relays M1 and M2 in circuit with capacitor C5. The capacitor C5 then provides a negative pulse through those relay coils, opposite in polarity to that applied during the ground-set operations, thereby causing the relays M1 and M2 to assume their first, normal states, wherein contacts M1A, M2A thereof are opened and contacts M1B, M2B thereof are closed.

After the line lifter 16 has been placed in its second state, test signals may be applied to the line L1 at the central office to result in the appearance of a negative potential, having a magnitude greater than −48 VDC, on the conductor R. If these test signals persist for a cumulative time on the order of a few seconds, the circuits in FIGS. 2 and 4 would undergo a reset operation. The circuit of FIG. 5 is therefore advantageous over those shown in FIGS. 2 and 4 inasmuch as the reset operation does not occur until a negative potential maintained on conductor R and appearing on conductor 230 at the line after 16 persists for a substantial period of time, e.g., 17 seconds.

TABLE III

| Component | Type and/or Value |
|---|---|
| R17 | 470 kilohms |
| R18 | 470 kilohms |
| R19 | 150 kilohms |
| R20 | 10 megohms |
| R21 | 470 kilohms |
| C5 | 2 microfarads |
| D9 | CD 12727 |
| D10 | IN3534-47 volts |
| D11 | CD 12727 |
| D12 | CD 12727 |
| D13 | CD 12727 |
| D14 | CD 12727 |
| D15 | IN3534-47 volts |
| D16 | CD 12727 |
| Q5 | 2N2484 |
| 236 | same as switching circuit 36 |

It may be sufficient in certain applications to dispense with the automatic reset feature of the embodiments of the invention shown in FIGS. 2, 4 and 5 in which the line lifter circuit therein undergoes a reset operation upon reconnection of the central office battery in the central office 10 with line L1. To provide this automatic reset feature, the circuits previously described must include components for responding to a second or reset potential which has a magnitude with respect to ground potential which is lower than that of the first potential used to place the line lifter in its second state. If the automatic reset feature may be dispensed with, then the simplified circuit shown in FIG. 6 may be used.

Figure 6:
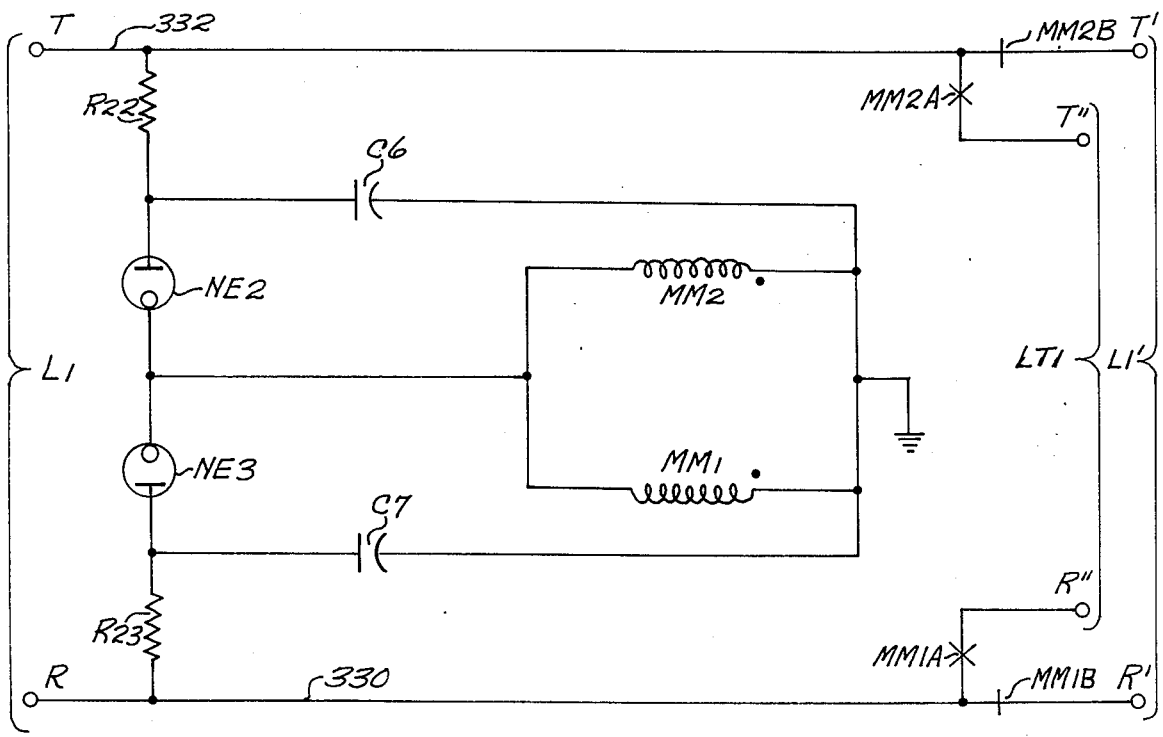

Assuming that the circuit in FIG. 6 is being utilized as the line lifter 16, it is noted that the circuit includes a conductor 330 for interconnecting the conductors R and R' of lines L1 and L1', and a conductor 332 for interconnecting the conductors T and T' of lines L1 and L1'. A resistor R22, a neon gas tube NE2, a neon gas tube NE3, and a resistor R23 are connected in series across conductors 332 and 330. A capacitor C6 is connected from the common junction of resistor R22 and neon gas tube NE2 to ground, and a capacitor C7 is connected from the common junction of resistor R23 and neon gas tube NE3 to ground. The relay coils of relays MM1 and MM2 are connected in parallel between the common junction of neon gas tubes NE2 and NE3 and ground. The relay coils of relays MM1 and MM2 are connected with the same polarity and have associated therewith respective relay contacts MM1A, MM1B and MM2A, MM2B. Contacts MM1A and MM2A function to connect the conductors 330 and 332, respectively, to the conductors R", T" of line LT1, and contacts MM1B, MM2B function to connect the conductors 330 and 332, respectively, to the conductors R', T' of line L1'. In the normal, first state of line lifter 16, contacts MM1A, MM2A are open and contacts MM1B, MM2B are closed. In practice, the relays MM1 and MM2 may be identical to the relays K1 and K2 shown in FIG. 2.

With the circuit of FIG. 6, a plurality of ground-set operations and a plurality of reset operations are possible.

In the ground-set operations, a first potential signal is applied to the line L1 at the central office 10, such as by the switchable power supply 22, so that either the conductor R or the conductor T is maintained at some positive potential, e.g., +100 VDC. The neon gas tubes NE2 and NE3 are preferably chosen to have a threshold or firing voltage within the range of 70 to 90 volts, and to have a maintaining voltage (the voltage across the neon gas tube when conducting) which is preferably 20 volts less than the firing voltage.

When a positive potential with respect to ground, e.g., +100 VDC, is applied to the conductor R, a charging current path for capacitor C6 exists from conductor 332 to ground through resistor R22 and capacitor C6. With the component values listed hereinafter in TABLE IV, those skilled in the art will appreciate that capacitor C6 will charge in about 2 seconds to a point where the voltage thereacross equals the threshold or firing voltage of neon gas tube NE2 when the voltage with respect to ground provided by the potential appearing on conductor 332 equals or exceeds 90 VDC. Since capacitor C6 is connected directly across neon gas tube NE2 (through the relay coils of relays MM1 and MM2), neon gas tube NE2 fires to provide a conducting path therethrough to complete a circuit through the relay coils of relays MM1 and MM2. Shortly after neon gas tube NE2 fires, the voltage thereacross drops to the maintaining voltage, and the voltage difference between the voltage across capacitor C6 at the time of firing and the maintaining voltage of neon gas tube NE2 results in a positive voltage pulse being developed across the relay coils MM1 and MM2 with sufficient energy to place those relays in their second state, wherein contacts MM1A and MM2A thereof are closed and contacts MM1B and MM2B thereof are open.

A similar operation occurs when positive potential is applied to the conductor R. In this case, however, the charging current path is from conductor 330 through resistor R23 and capacitor C7 to ground, and neon gas tube NE3 fires to develop a positive voltage pulse across the coils of relays MM1 and MM2. The application of a positive potential to both the conductors T and R at the central office 10 results in both capacitors C6 and C7 being charged to a point where they will fire their respective neon gas tubes NE2 and NE3 to thereby develop a positive voltage pulse across the coils of relays MM1 and MM2.

In the reset operations, either or both of the conductors T and R are maintained at some negative potential, e.g., −100 VDC. In these operations, either or both capacitors C6 and C7 charge to a point where the voltage thereacross exceeds the firing voltages of either or both neon gas tubes NE2 and NE3, resulting in a negative pulse being applied across the coils of relay MM1 and MM2, to place those relays in their first state wherein contacts MM1A and MM2A thereof are opened, and contacts MM1B and MM2B thereof are closed.

TABLE IV

| Component | Value |
|---|---|
| R22 | 1 megohm |
| R23 | 1 megohm |
| C6 | 2.2 microfarads |
| C7 | 2.2 microfarads |

While the invention has been described with respect to several embodiments, it is to be clearly understood by those skilled in the art that the invention is not limited thereto, but rather is intended to be interpreted only in accordance with the appended claims.

The embodiments of the invention in which an exclusive property or privilege is claimed, are defined as follows:

1. A line lifting apparatus for disconnecting a telephone line, which telephone line has a pair of conductors extending between a central office and a customer station, from the customer station at a predetermined location along the telephone line, said line lifting apparatus comprising:

capacitance means; voltage threshold switching circuit means which is operative to provide a conducting path therethrough when the voltage thereacross equals or exceeds a predetermined threshold value; bistable switching means having a pair of input terminals, said bistable switching means being operative to switch to and remain in a first state in response to current flow in a first direction between said pair of input terminals, and to switch to and remain in a second state in response to current flow in a second, opposite direction between said pair of input terminals, said bistable switching means being adapted to interconnect the telephone line and the customer station at said predetermined location when in said first state and to disconnect the telephone line from the customer station at said predetermined location when in said second state; first circuit means connecting said capacitance means and said voltage threshold switching circuit means in series circuit with said pair of input terminals of said bistable switching means; and, second circuit means coupling said capacitance means to the pair of conductors of the telephone line, said second circuit means responding to the presence for a predetermined period of time of a first potential on at least one conductor of the telephone line to charge said capacitance means to a voltage whose magnitude is greater than said threshold value to cause said voltage threshold switching circuit means to provide a conducting path therethrough, and whose polarity is such as to produce current flow in said second direction between said pair of input terminals of said bistable switching means upon discharge of said capacitance means through said series circuit, said second circuit means further responding to the presence for a predetermined period of time of a second potential on at least one conductor of the telephone line to charge said capacitance means to a voltage whose magnitude is greater than said threshold value to cause said voltage threshold switching circuit means to provide a conducting path therethrough, and whose polarity is such as to produce current flow in said first direction between said pair of input terminals of said bistable switching means upon discharge of said capacitance means through said series circuit.

2. A line lifting apparatus as recited in claim 1, wherein said bistable switching means comprises a bistable latching relay means.

3. A line lifting apparatus as recited in claim 1, wherein said first and said second potentials have opposite polarities with respect to a reference potential.

4. A line lifting apparatus as recited in claim 1, wherein said bistable switching means is further adapted to interconnect a telephone line with a line test termination means when in said second state.

5. A line lifting apparatus as recited in claim 1, wherein said first potential has a predetermined magnitude with respect to a reference potential, and said second potential also has a predetermined magnitude with respect to said reference potential which is smaller than the predetermined magnitude of said first potential.

6. A line lifting apparatus as recited in claim 5, wherein said predetermined magnitude of said second potential is equal to or less than the magnitude of the potential normally applied to said at least one conductor of the telephone line by a central office station battery when the telephone line is in an idle state.

7. A line lifting apparatus as recited in claim 5, wherein said second circuit means includes: first and second resistance means connected in series between a first one of the conductors of the telephone line and one side of said capacitance means; means coupling the other side of said capacitance means to a second one of the conductors of the telephone line; a third resistance means; first switching means normally connecting said third resistance means in parallel with the series connection of said first and second resistance means, said first switching means disconnecting said third resistance means therefrom when said first and second ones of said conductors are equipotential; fourth resistance means; second switching means connecting said fourth resistance means across said capacitance means when the potential on said first one of said conductors has a first polarity with respect to the potential on said second one of said conductors; and, voltage breakdown means connected from a common junction of said first and second resistance means to ground potential, said voltage breakdown means being operative to provide a conducting path therethrough when the potential of said common junction exceeds a predetermined breakdown value with respect to ground potential, wherein the resistance values of said first, second, third and fourth resistance means are chosen to provide current to said capacitance means from said first and second ones of said conductors in an amount sufficient to charge said capacitance means to a voltage greater than said threshold value: when said first one of said conductors has present thereon a potential, having said first polarity with respect to ground potential, whose magnitude equals or exceeds that of said first potential and said second one of said conductors is at ground potential; when said first and said second ones of said conductors both have present thereon a potential, having a second polarity with respect to ground potential, said second polarity being opposite to that of said first polarity, whose magnitude equals or exceeds that of said first potential, and when said first one of said conductors has present thereon a potential, having said second polarity with respect to ground potential, whose magnitude equals or exceeds that of said second potential and said second one of said conductors is at ground potential.

8. A line lifting apparatus as recited in claim 7, wherein said first polarity is positive and said second polarity is negative.

9. A line lifting apparatus as recited in claim 7, wherein said threshold value is 36 VDC, the magnitude of said first potential with respect to ground potential is substantially 90 VDC, the magnitude of said second potential with respect to ground potential is substantially 48 VDC, and said resistance values of said first, second, third and fourth resistance means are, respectively, substantially 2.2 megohms, 2.2 megohms, 1.5 megohms, and 820 kilohms.

10. A line lifting apparatus as recited in claim 5, wherein said second circuit means includes: a first resistance means interconnecting one side of said capacitance means with a first one of the conductors of the telephone line; a second resistance means interconnecting the other side of said capacitance means with a second one of said conductors; a third resistance means interconnecting said other side of said capacitance means with ground potential; a fourth resistance means; and, first switching means connecting said fourth resistance means across said capacitance means when the potential on said second one of said conductors has a first polarity with respect to the potential on said first one of said conductors, wherein the resistance values of said first, second, third and fourth resistance means are chosen to provide current to said capacitance means in an amount sufficient to charge said capacitance means to a voltage greater than said threshold value: when said first one of said conductors is at ground potential and said second one of said conductors has present thereon a potential, having said first polarity with respect to ground potential, whose magnitude equals or exceeds that of said first potential; when said first and said second ones of said conductors both have present thereon a potential, having a second polarity with respect to ground potential, which is opposite to said first polarity whose magnitude equals or exceeds that of said first potential; and when said first one of said conductors has present thereon a potential, having said first polarity with respect to ground potential, whose magnitude equals or exceeds that of said second potential and said second one of said conductors is at ground potential.

11. A line lifting apparatus as recited in claim 10, wherein said first polarity is positive and said second polarity is negative.

12. A line lifting apparatus as recited in claim 10, wherein said threshold voltage is 36 VDC, the magnitude of said first potential is substantially 90 VDC, the magnitude of said second potential is substantially 48 VDC, and the resistance values of said first, second, third and fourth resistance means are, respectively, substantially 470 kilohms, 470 kilohms, 750 kilohms, and 1.5 megohm.

13. A line lifting apparatus as recited in claim 5, wherein said second circuit means comprises: means interconnecting one side of said capacitance means with ground potential; first branch means interconnected with a first one of the conductors of the telephone line and a common junction, said first branch means including a first resistance means and being operative to couple said first resistance means between said first one of said conductors and said common junction when the potential on said first one of said conductors has a first polarity with respect to ground potential; second branch means interconnected with a second one of said conductors and said common junction, said second branch means including a second resistance means and being operative to couple said second resistance means between said second one of said conductors and said common junction when the potential on said second one of said conductors has said first polarity; voltage breakdown means interconnecting the other side of said capacitance means with said common junction, wherein the resistance values of said first and said second resistance means and the breakdown voltage of said voltage breakdown means are chosen to provide current to said capacitance means from either or both of said first and second ones of said conductors in an amount sufficient to charge said capacitance means to a voltage greater than said threshold value when either or both of said first and second ones of said conductors has present thereon a potential, having said first polarity, whose magnitude equals or exceeds that of said first potential; a constant current source; means interconnecting said constant current source with said second one of said conductors and with said other side of said capacitance means, wherein said constant current source is operative to provide a current to said capacitance means from said second one of said conductors in an amount sufficient to charge said capacitance means to a voltage greater than said threshold voltage when said second one of said conductors has present thereon a potential, having a second polarity with respect to ground potential which is opposite to that of said first polarity, whose magnitude equals or exceeds that of said second potential, the magnitude of the current provided by said constant current source being substantially less than that provided by said first and said second branch means so that a proportionally longer time is required for said constant current source to charge said capacitance means to a voltage greater than said threshold voltage.

14. A line lifting apparatus as recited in claim 13, wherein said first polarity is positive and said second polarity is negative.

15. A line lifting apparatus as recited in claim 13, wherein said threshold voltage is 36VDC, the magnitude of said first potential with respect to ground potential is substantially 90VDC, the magnitude of said second potential with respect to ground potential is substantially 48VDC, said resistance values of said first and second resistance means are, respectively, substantially 470 kilohms, and said breakdown voltage of said voltage breakdown means is substantially 48 VDC.

16. A line lifting apparatus as recited in claim 1, wherein said first potential has a predetermined magnitude and a first polarity with respect to ground potential, and said second potential has a predetermined magnitude, substantially equal to that of said first potential, and a second polarity opposite to that of said first polarity, with respect to ground potential.

17. A line lifting apparatus as recited in claim 16, wherein: said capacitance means comprises first and second capacitors; said voltage threshold switching circuit means comprises first and second neon gas tubes, each of which has a firing voltage equal to said threshold value; said first circuit means includes a first series circuit of said first capacitor and said first neon gas tube which is connected in parallel with said bistable switching means, and a second series circuit of said second capacitor and said second neon gas tube which is connected in parallel with said bistable switching means, each of said first and second capacitors having a first common junction with said bistable switching means and said first and second capacitors having respective second and third common junctions with said first and second neon gas tubes; said first means further includes means coupling said first common junction to ground potential; said second circuit means includes a first resistance means interconnecting said second common junction with a first one of the conductors of the telephone line and second resistance means interconnecting said third common junction with a second one of said conductors; and wherein the resistance values of said first and second resistance means are chosen to provide current to said capacitance means from either or both of said first and second ones of said conductors in an amount sufficient to charge said capacitance means to a voltage greater than said threshold value when either or both of said first and second ones of said conductors has present thereon a potential having a magnitude equaling or exceeding said predetermined magnitudes of said first and second potentials and having either said first or second polarities with respect to ground potential.

18. A line lifting apparatus as recited in claim 17, wherein said first polarity is positive and said second polarity is negative.

19. A line lifting apparatus as recited in claim 17, wherein said threshold voltage is 90VDC, the magnitude of said first and second potentials with respect to ground potential is substantially 90VDC, and said resistance values of said first and second resistance means are each substantially 1 megohm.

* * * * *